United States Patent
Voskuil et al.

(10) Patent No.: US 7,434,708 B2
(45) Date of Patent: *Oct. 14, 2008

(54) VALVE ASSEMBLY

(75) Inventors: Mark M. J. Voskuil, Oegstgeest (NL); Pieter J. M. Alkemade, Voorhout (NL)

(73) Assignee: Fluid Management, Inc., Wheeling, IL (US)

( * ) Notice: Subject to any disclaimer, the term of this patent is extended or adjusted under 35 U.S.C. 154(b) by 232 days.

This patent is subject to a terminal disclaimer.

(21) Appl. No.: 10/871,483

(22) Filed: Jun. 18, 2004

(65) Prior Publication Data

US 2004/0262330 A1    Dec. 30, 2004

Related U.S. Application Data

(63) Continuation of application No. 10/113,407, filed on Apr. 1, 2002, now Pat. No. 6,811,058.

(51) Int. Cl.
*B67D 5/04* (2006.01)
*B67D 5/06* (2006.01)
*B67D 5/064* (2006.01)
*F16K 25/00* (2006.01)
*G01F 11/028* (2006.01)
*B65B 1/004* (2006.01)

(52) U.S. Cl. .................. 222/168.5; 222/380; 222/144; 141/103; 251/206

(58) Field of Classification Search .............. 222/135, 222/144, 380, 381, 452, 506, 555, 125, 137, 222/309, 129, 168.5, 255, 144.5; 251/207, 251/206; 141/103, 104, 147
See application file for complete search history.

(56) References Cited

U.S. PATENT DOCUMENTS

| 932,960 | A |   | 8/1909 | Cappon |
| 1,017,292 | A | * | 2/1912 | Hyde ......................... 251/207 |
| 2,988,248 | A | * | 6/1961 | Bender et al. ............... 222/235 |
| 3,115,896 | A | * | 12/1963 | Roberts et al. ......... 137/625.41 |
| 3,122,272 | A |   | 2/1964 | Marsh |
| 4,027,785 | A | * | 6/1977 | Edstrom et al. ............. 222/135 |
| 4,781,312 | A | * | 11/1988 | Strazdins .................... 222/309 |
| 5,078,302 | A |   | 1/1992 | Hellenberg |

(Continued)

FOREIGN PATENT DOCUMENTS

EP    0843116 A2    5/1998

OTHER PUBLICATIONS

Search Report from European Patent Office dated Jun. 26, 2003.

*Primary Examiner*—Kevin P. Shaver
*Assistant Examiner*—Melvin A. Cartagena
(74) *Attorney, Agent, or Firm*—Miller, Matthias & Hull

(57) ABSTRACT

A valve assembly for a fluid dispenser includes a housing having at least a first opening and a second opening, and a valve member fitted in the housing, the valve member being rotatable about an axis and comprising a first channel, extending along said axis and communicating with the first opening in the housing, and at least two outlet channels radially extending from the first channel to the circumference of the valve member, wherein each of the radially extending outlet channels can be brought in register with the second opening by rotating the valve member.

10 Claims, 4 Drawing Sheets

U.S. PATENT DOCUMENTS

| | | |
|---|---|---|
| 5,632,816 A | 5/1997 | Allen et al. |
| 5,983,937 A | 11/1999 | Makihara et al. |
| 6,003,731 A | 12/1999 | Post et al. |
| 6,273,298 B1 | 8/2001 | Post |

\* cited by examiner

VALVE ASSEMBLY

REFERENCE TO RELATED APPLICATION

This application is a continuation of application Ser. No. 10/113,407, filed on Apr. 1, 2002, now U.S. Pat. No. 6,811,058.

TECHNICAL FIELD

A valve assembly for a fluid dispenser and a fluid dispenser comprising the same are disclosed.

BACKGROUND OF THE RELATED ART

Valve assemblies for viscous fluid dispensers are known from U.S. Pat. No. 6,003,731. FIGS. 16 and 19a-19d of the '731 patent show a pumping arrangement (117) adapted to draw fluid from a package (101) and subsequently expel the fluid in accurate dosages.

However, the valve assembly disclosed in the '731 patent is prone to clogging and therefore can be unreliable and require frequent maintenance procedures. Further, the valve assembly disclosed in the '731 patent includes only one outlet opening or channel and therefore the dispensing apparatus of the '731 patent can perform at only limited dispense rates.

Therefore, there is a need for an improved valve assembly for liquid dispensers which are more reliable, require less maintenance and which are capable of dispensing at slower, more accurate dispense rates and faster dispense rates.

SUMMARY OF THE DISCLOSURE

A valve assembly for a dispenser for viscous fluids is disclosed which comprises:
  a housing having at least a first opening and a second opening, and
  a valve member fitted in the housing, the valve member being rotatable about an axis and comprising a first channel, extending along said axis and communicating with the first opening in the housing, and at least two outlet channels radially extending from the first channel to the circumference of the valve member;
  wherein each of the radially extending outlet channels can be brought in registry with the second opening by rotating the valve member.

Thus, one of two or more outlet channels are available, rendering the valve assembly more versatile, e.g., by employing outlet channels that are mutually different, and/or more reliable, e.g., when one of the outlet channels is no longer operational as a result of fouling or clogging, another outlet opening can be used.

In an embodiment, the diameter of at least one of the radially extending outlet channels differs from that of the other channel(s). For example, one channel can have a small diameter suitable for precision dispensing, whereas the other has a (relatively) large diameter for rapidly dispensing (relatively) large amounts.

In a further preferred embodiment which is especially suitable for use in association with a buffer or pump, the housing comprises a third opening and
  the valve member further comprises an inlet channel, radially extending from the circumference of the valve member to the first (axial) channel;
  wherein the inlet channel can be brought in register with the third (inlet) opening by rotating the valve member.

The diameter of the second (outlet) opening in the housing may be larger than the diameter of at least some or all of the radially extending channels. In such a configuration, the fluid will be dispensed directly from the valve member, i.e., without an additional spout or nozzle, and fouling is reduced.

An apparatus for dispensing viscous fluids is also disclosed which comprises:
  a turntable rotatable around an axis of rotation;
  a plurality of pumps attached to and distributed around the axis of the turntable;
  at least one of the pumps comprising a valve assembly according to the present invention.

The apparatus can be used, e.g., as a dispenser for several different pigments, colorants, base paints and/or additives, such as solvents or binders, which can be mixed with each other or, e.g., with a further base paint, at a point of sale.

BRIEF DESCRIPTION OF THE DRAWINGS

The disclosed valve assembly and dispensing apparatus will be further explained with reference to the accompanying drawings in which an embodiment is shown schematically.

It is noted that the drawings are not necessarily to scale and that details, which are not necessary for an understanding of the present invention, may have been omitted. As a matter of course, the disclosure is not limited to the particular embodiments illustrated herein.

DETAILED DESCRIPTION OF THE PRESENTLY PREFERRED EMBODIMENTS

Figure 1:
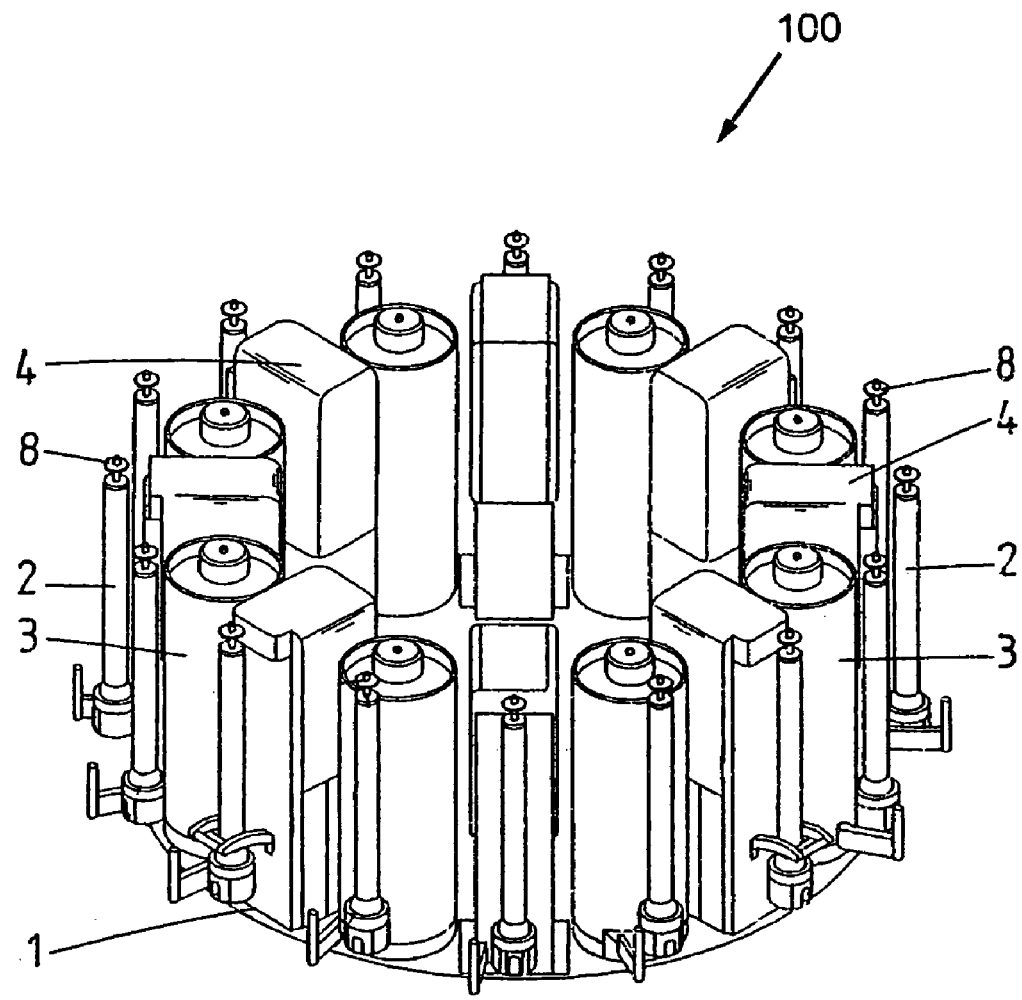
FIG. 1 is a perspective view of a part of a disclosed apparatus for dispensing viscous fluids.

FIG. 1 illustrates the main parts of an example of an apparatus 10 for dispensing viscous fluids, such as paints or dyes. This particular dispensing apparatus is an automated version and includes a turntable 1. The turntable 1 is rotatable about a vertical axis by means of a drive (not shown) in order to rotate the turntable 1 between discrete positions.

On the turntable 1, there is mounted a plurality of pumps 2, e.g., sixteen pumps. Each pump 2 is associated with a fluid container, in this case two types of fluid containers: alternately a stationary type canister 3 and a replaceable flexible package (not shown) contained in a rigid, removable holder 4. When one of the canisters 3 is empty or nearly empty, it should be refilled by pouring fluid, such as a paint component, into it. When a flexible package is empty, the package and the holder 4 containing it can be removed. Subsequently, the holder 4 can be opened to take out the empty package and to insert a new, filled package, upon which the holder 4 and the filled package can be placed back in the original position. Further details of the said apparatus are disclosed in U.S. Pat. No. 6,273,298, the contents of which are incorporated herein by reference.

Figure 2:
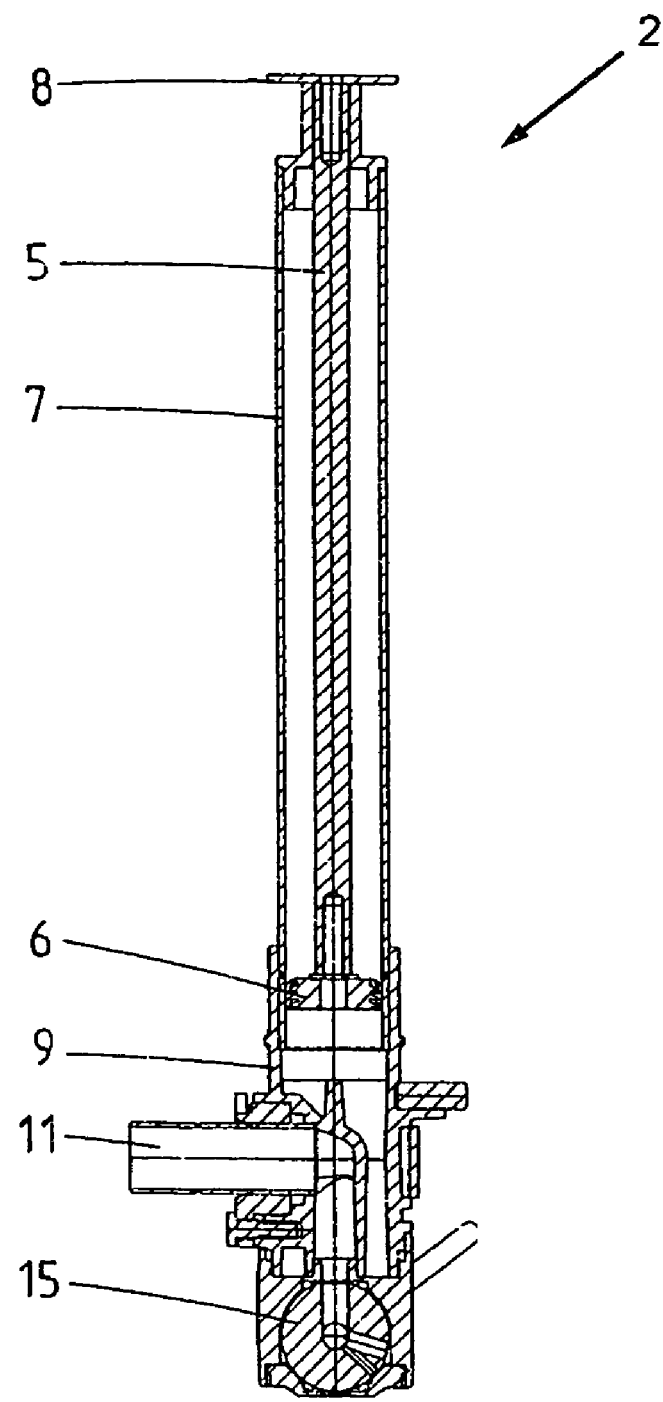
FIG. 2 is cross-sectional side view of a disclosed valve assembly suitable for use in the apparatus of FIG. 1.
Figure 3:
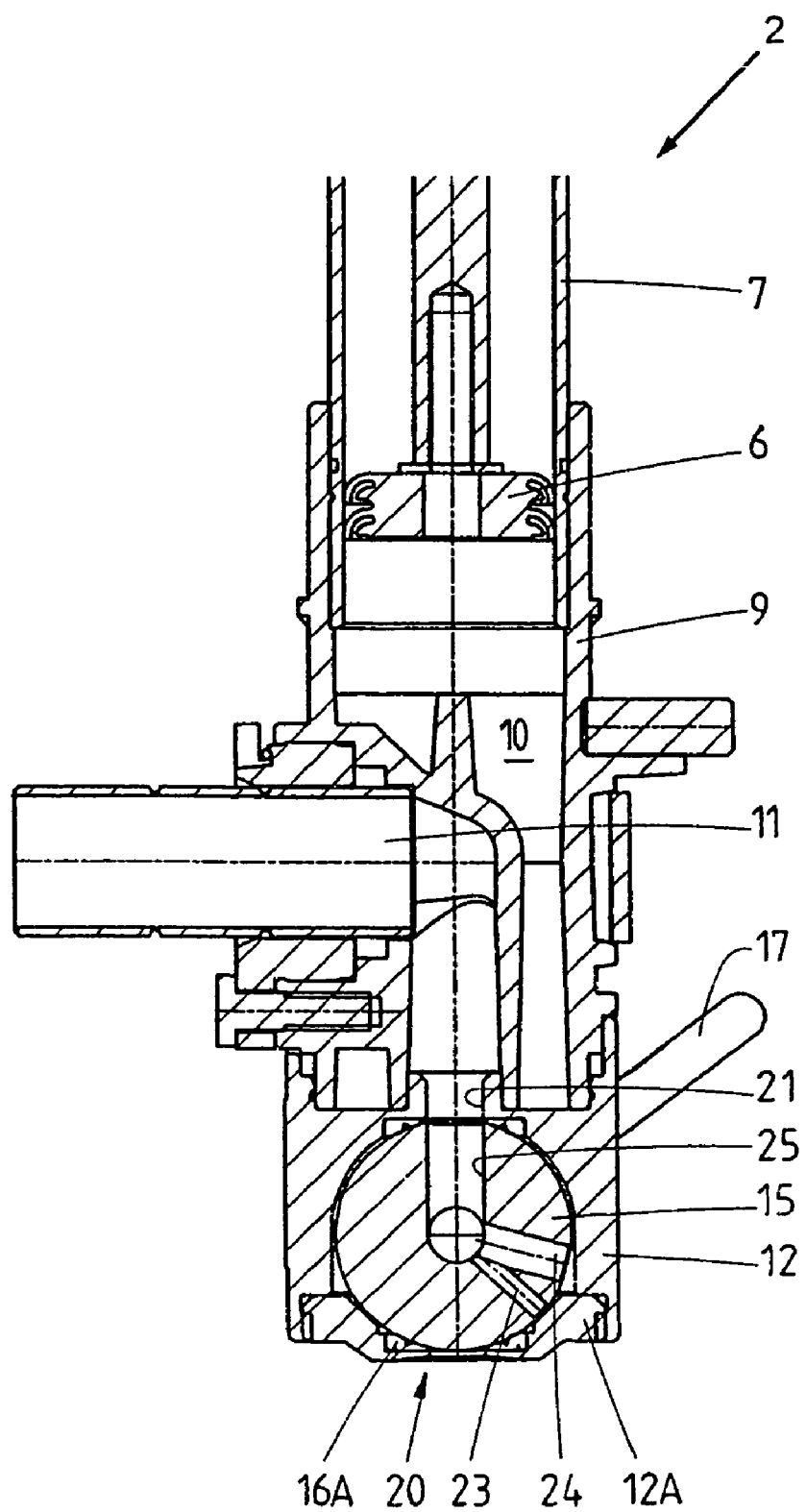
FIG. 3 is a partial detail view of the valve assembly of FIG. 2.
Figure 4:
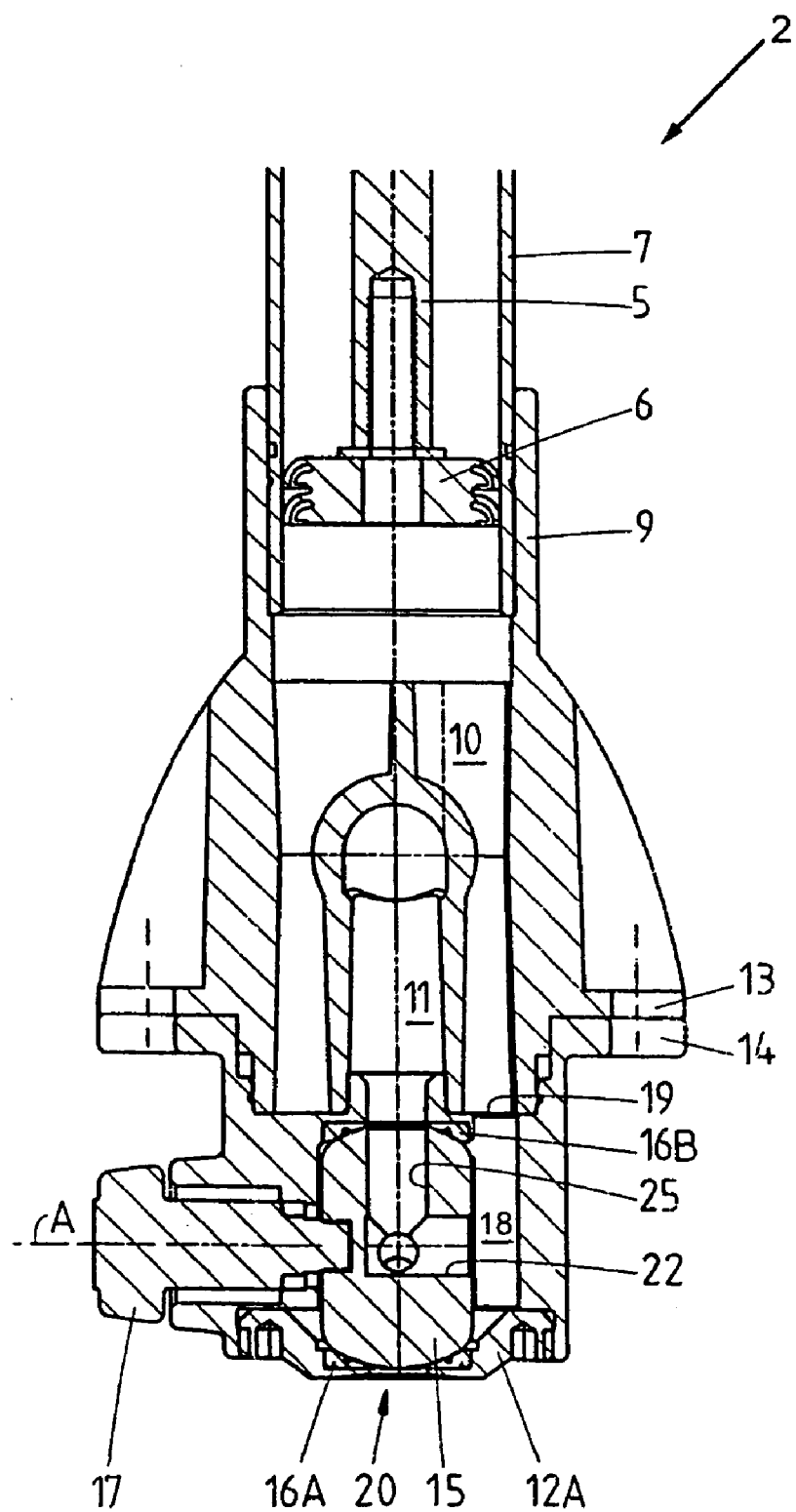
FIG. 4 is a cross-sectional front view of the valve assembly as shown in FIG. 3.

FIGS. 2 to 4 show cross-sections of an embodiment of a pump 2 associated with a valve assembly suitable for use in the apparatus of FIG. 1. The pump 2 is of the piston-type and includes a piston rod 5 provided with a piston 6, disposed within a cylinder 7 of the pump 2, and an upper flange 8. This flange 8 that can be engaged by an actuator (not shown) adapted to move the piston rod 5 and the piston 6 upwards during an intake stroke and downwards during a discharge stroke. The actuator is stationary and the turntable 1 is adapted to position one of the pumps 2 in line with the actuator in order to enable it to actuate the pump 2.

The cylinder 7 is mounted in the top part of a pump housing 9, which defines a cavity 10 and further includes an inlet channel 11 that is separated from the cavity 10 and adapted to be in fluid communication with a fluid container 3, 4 as shown in FIG. 1. A valve housing 12, comprising a cover 12A, is attached to the lower part of the pump housing 9 by means of respective flanges 13, 14. A valve member, preferably a ball valve 15, is fitted in the housing 12 by means of two annular bearings 16A, 16B made of, e.g., a polymeric material, such as PTFE (Teflon™). The valve member 15 is provided with a lever 17 with which it can be rotated about an axis A.

In the disclosed valve assemblies, it is generally preferred that the valve member is of the ball type. At normal operating temperatures, within a range from 0 to 50° C., ball type valves are less sensitive to leaking and/or seizing resulting from temperature changes than, e.g., cylindrical valves.

The valve housing 12 further defines a cavity 18 limited at its upper part by a first opening 19, through which the cavity 18 communicates with the cavity 10 of the pump housing 9. The valve housing 12 further includes a second or outlet opening 20 in its bottom part and a third opening 21 which communicates with the inlet channel 11 in the pump housing 9.

The valve member 15 includes a first channel 22, extending along the axis A and communicating with the first opening 19 in the housing 12. It further includes at least two outlet channels 23, 24 and an inlet channel 25, all radially extending from the first channel 22 to the circumference of the valve member 15.

In this particular embodiment, the diameter of one of the outlet channels 23 is smaller than that of the other 24 and the diameter of both outlet channels 23, 24 is smaller than that of the inlet channel 25. Further, both of these diameters are smaller than the diameter of second or outlet opening 20 and the central axes of channels 23-25 are all located on the same sectional plane through the valve member 15 and are respectively, e.g., 30° and 100° apart.

FIG. 2 shows the intake position of the valve member, where the inlet channel 25 of the valve member 15 is in registry with the third opening 21 of the valve housing 12 and thus with the inlet channel 11. In other words, the fluid container communicates with the cavity 10 in the pump housing 9 and the cylinder 7. In this position, the cavity 10 and cylinder 7 now can be filled with a desired amount of the fluid from the container by moving the piston 6 upwards over a desired or predetermined length. It is noted that, in this position, the inlet channel 22 temporarily serves as an outlet channel.

As soon as an appropriate amount of fluid is taken in, the valve member 15 can be rotated to the desired dispensing position, i.e., until the desired output channel 23, 24 is in register the outlet opening 20, which in this particular embodiment amounts to a travel of respectively 50° and 80°, and the piston 6 can be moved downwards to dispense a desired or predetermined amount from the said opening 20. If this amount of fluid is relatively small and/or the dosage should be precise, the relatively narrow output channel 23 is appropriate and, if this amount is relatively large and/or should be dispensed rapidly, the relatively wide output channel 24 is appropriate.

Thus, the valve assembly enables the tailored and, if need be, precise and/or rapid dispensing of viscous fluids, without having to exchange the valve assembly or components of the valve assembly.

It is generally preferred that the angle between the inlet channel on the one hand and each of the outlet channels on the other is at least 90°, since in that case the rotational distance between the intake and discharge positions and thus the travel of the valve member is relatively small.

It is further preferred that the height of the second or outlet opening at the bottom side of the valve housing is less than 1 mm, e.g., 0,5 mm, so as to further reduce fouling and/or facilitate the cleaning of the said outlet opening.

The valve assembly is not restricted to the embodiment shown in the drawing and described herein before. For example, the number of outlet channels as well as their relative locations in the valve member can be varied at will. Also, the valve assembly can be mounted directly onto or into (the bottom part of) a container, i.e., without the presence of a pump mechanism. As a further example, the above-mentioned parts, in particular the housings, can be made of any suitable material, e.g., a metal, such as stainless steel, of a polymer material, such as POM or PEEK.

What is claimed:

1. A pump for viscous fluids comprising:
   a housing having at least a first opening in communication with a pump cavity, a second discharge opening and a third intake opening in communication with a pump inlet channel, the pump inlet channel in communication with a fluid reservoir, the pump cavity in communication with a cylinder; and
   a valve member disposed within the housing, the valve member being rotatable about an axis and comprising at least one axial channel extending along or parallel to the axis and communicating with the first opening in the housing, at least two outlet channels extending radially from the axial channel to a circumference of the valve member, and at least one inlet channel radially extending from a circumference of the valve member to the axial channel;
   wherein a diameter of one of the radially extending outlet channels is smaller than that of the other outlet channel(s) for precision dispensing of the viscous fluid,
   wherein diameters of the radially extending outlet channels are smaller than diameters of the second opening and the inlet channel, and
   wherein each of the radially extending outlet channels can be brought in registry with the second opening by rotating the valve member.

2. The pump according to claim 1, wherein an angle between two of the outlet channels is about 30°.

3. The pump according to claim 1, wherein a height of the second opening is less than 1 mm.

4. The pump according to claim 1, wherein the valve member is substantially disk-shaped.

5. An apparatus for dispensing fluids, comprising:
   a turntable rotatable around an axis of rotation; and
   a plurality of pumps, at least one of which is made in accordance with claim 1 attached to and distributed around the axis of the turntable.

6. An apparatus for dispensing fluids, comprising:
   a turntable rotatable around an axis of rotation;
   a plurality of pumps, at least one of which is made in accordance with claim 1 attached to and distributed around the axis of the turntable.

7. A pump for viscous fluids comprising:
   a housing having at least a first opening in communication with a pump cavity, a second discharge opening and a third intake opening in communication with a pump inlet channel, the pump inlet channel in communication with a fluid reservoir, the pump cavity in communication with a cylinder; and a valve member disposed within the housing, the valve member being rotatable about an axis and comprising at least one axial channel extending along or parallel to the axis and communicating with the first opening in the housing, and two outlet channels extending radially from the at least one axial channel to a circumference of the valve member, and the valve member further comprising an inlet channel radially extending from a circumference of the valve member to the at least one axial channel;

wherein a diameter of one of the radially extending outlet channels is smaller than that of the other outlet channel(s) for precision dispensing of the viscous fluid, wherein diameters of the radially extending outlet channels are smaller than diameters of the second opening and the inlet channel, and wherein each of the radially extending outlet channels can be brought in registry with the second opening by rotating the valve member.

8. The pump according to claim 7, wherein an angle between two of the outlet channels is about 30°.

9. The pump according to claim 7, wherein a height of the second opening is less than 1 mm.

10. The pump according to claim 7, wherein the valve member is substantially disk-shaped.

* * * * *